United States Patent [19]

Nemiroff et al.

[11] 4,060,448

[45] Nov. 29, 1977

[54] YTTRIUM IRON GARNET DISKS ON GADOLINIUM GALLIUM SUBSTRATES FOR MICROWAVE APPLICATIONS

[75] Inventors: Michael Nemiroff, Solana Beach, Calif.; Hong Jun Yue, Bud Lake, N.J.; William Russell Schevey, Honesdale, Pa.

[73] Assignee: Allied Chemical Corporation, Morris Township, N.J.

[21] Appl. No.: 763,964

[22] Filed: Jan. 28, 1977

[51] Int. Cl.[2] .......................... B44C 1/00; C03C 15/00; C23F 1/02

[52] U.S. Cl. .......................... 156/653; 156/657; 156/659; 427/130; 427/131

[58] Field of Search .................. 340/174 EB, 174 TF; 427/127-132; 148/100, 122; 156/600, 621, 650-657, 659, 661, 662, 663, 667; 252/79.2, 79.3; 96/36.2, 38.4

[56] References Cited

U.S. PATENT DOCUMENTS

| | | | |
|---|---|---|---|
| 3,753,814 | 8/1973 | Pulliam et al. | 156/656 |
| 3,991,233 | 11/1976 | Verhulst et al. | 427/131 X |

*Primary Examiner*—William A. Powell
*Attorney, Agent, or Firm*—David W. Collins; Jay P. Friedenson

[57] ABSTRACT

A process is disclosed for fabricating narrow line-width yttrium iron garnet (YIG) disks suitable for microwave applications. The process comprises forming an epitaxial thin film of yttrium iron garnet, containing from about 0.5 to 1.5 atom percent trivalent lanthanum ions on the dodecahedral sites, on a substrate such as gadolinium gallium garnet (GGG), forming a thin layer of $SiO_2$ on the YIG film, forming a photoresist mask layer on the $SiO_2$ layer, removing portions of the photoresist mask layer to expose portions of the underlying $SiO_2$ layer, removing portions of the $SiO_2$ layer to expose portions of the underlying YIG layer and removing the exposed portions of the YIG layers to form isolated La:YIG disks supported on the GGG substrate. The substrate is then further processed, as by dicing, to provide individual La:YIG disks for fabrication into microwave devices. Linewidths of about 0.45 Oe are obtained by the process.

15 Claims, 6 Drawing Figures

YTTRIUM IRON GARNET DISKS ON GADOLINIUM GALLIUM SUBSTRATES FOR MICROWAVE APPLICATIONS

BACKGROUND OF THE INVENTION

1. Field of the Invention

This invention relates to microwave electronic devices employing yttrium iron garnet, and, in particular, to a process for providing lanthanum-doped yttrium iron garnet disks suitable in such devices.

2. Description of the Prior Art

Yttrium iron garnet ($Y_3Fe_5O_{12}$; YIG) is an important material for microwave elecronic devices because of its high Q value at microwave frequencies. Currently, spheres of YIG are widely used as narrow band filters, microwave resonators and the like. The spheres are individually fabricated from flux grown YIG single crystals by a a crystal growth process which commonly requires a few weeks. The fabrication of crystals into small spheres is time consuming and requires sophisticated polishing techniques.

Liquid phase epitaxy (LPE) growth of YIG films on gadolinium gallium garnet ($Gd_3Ga_5O_{12}$; GGG) substrates, with subsequent processing into photoetched disks, has been disclosed in Vol. MAG-9, *IEEE Transactions on Magnetics,* pp. 535–7 (1973). Since YIG has a smaller lattice parameter than GGG, $Pb^{2+}$ ions were incorporated in the YIG lattice to achieve a closer match of lattice parameter constants in order to reduce strains that would otherwise arise due to lattice mismatch. The lead content, however, apparently resulted in a broadening of the ferromagnetic resonance linewidth, thus rendering the YIG disks less suitable for microwave resonant applications. Further, during processing of the YIG film to photoetch YIG disks, sputtered $SiO_2$ was used to mask the YIG film. The sputtered $SiO_2$ apparently resulted in surface damage of the YIG film, in consequence of which ferromagnetic resonance linewidth was further broadened.

A study of dependence of lattice parameter on composition in substituted yttrium iron garnet epitaxial layers grown on GGG substrates has been published; see, e.g., Vols. 17 and 26, *Journal of Crystal Growth,* pp. 322–328 (1972) and 122–126 (1974), respectively. In the study, yttrium is substituted by gadolinium, samarium and lanthanum, while iron is substituted by gallium. No useful methods for fabricating microwave devices are given, however.

SUMMARY OF THE INVENTION

In accordance with the invention, a mass production process is provided for fabricating arrays of thick, damage-free, yttrium iron garnet (YIG) disks. The process comprises a. forming a thin film of yttrium iron garnet, doped with about 0.5 to 1.5 atom percent trivalent lanthanum ions ($La^{3+}$), on a gadolinium gallium garnet substrate;

b. forming a thin layer of $SiO_2$ on the lanthanum-doped yttrium iron garnet layer;

c. forming a photoresist mask layer on the $SiO_2$ layer;

d. removing portions of the photoresist mask layer to expose portions of the underlying $SiO_2$ layer;

e. removing the exposed portions of the $SiO_2$ layer to expose portions of the underlying YIG layer; and f. removing the exposed portions of the YIG layer to form an array of isolated La:YIG disks supported on the GGG substrate.

The method, which utilizes the well-known isothermal LPE dipping process, provides narrow linewidth YIG films. Lattice mismatch between YIG and GGG is minimized by incorporating about 0.5 to 1.5 atom percent $La^{3+}$ ions on the dodecahedral sites of the YIG lattice.

La:YIG films are grown at a temperature of 950° to 960° C, which is approximately 100° C higher than prior art Pb,Pt:YIG films. Higher temperature melts are less viscous and thus leave smaller and fewer flux mesas on the surface of the film during flux spinoff after the film growth process.

DETAILED DESCRIPTION OF THE DRAWING

Thick YIG films, suitable for use in microwave devices, can be grown on GGG substrates only if the film substrate lattice mismatch is small. Undoped YIG films greater than 10 micrometers in thickness commonly crack due to the strain at the film-substrate interface. The lattice constant of undoped YIG is 0.008 A smaller than congruently grown GGG. The method disclosed herein employs nonmagnetic $La^{+3}$ to expand the YIG lattice to substantially match that of GGG. This is in contrast to the prior art of microwave devices, which incorporates $Pb^{2+}$ in the flux to expand the YIG lattice and $Pt^{4+}$ from the growth crucible as a charge compensating ion.

The process provided by the invention forms a thin epitaxial film of a lanthanum-doped yttrium iron garnet film on a substrate of gadolinium gallium garnet. Following deposition of the La:YIG film, the films are then processed into an array of disks by first applying a thin layer of $SiO_2$, spinning on a photoresist mask, and exposed the photoresist through a hole pattern mask. The resulting disk pattern is maintained through an $SiO_2$ etch, employing an HF etchant and then a garnet etch, employing a hot $H_3PO_4$ etchant. The $SiO_2$ layer is impervious to the high temperature phosphoric acid etch and is a necessary part of the process unless a photoresist which is also impervious to hot phosphoric acid is used. The $SiO_2$ layer may be removed if desired or left intact. If left intact, it can serve as a passivating layer for the La:YIG disks, since the $SiO_2$ layer does not adversely affect ferromagnetic resonance linewidth.

Figure 1:
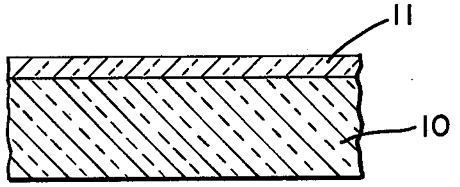
FIGS. 1 thourgh 6 in cross-section depict the sequence of processing steps of a microwave device in accordance with the invention.

The process is more conveniently described with reference to FIGS. 1 through 6. In FIG. 1, a substate 10 of gadolinium gallium garnet ($Gd_3Ga_5O_{12}$; GGG) supports a thin film 11 of yttrium iron garnet ($Y_3Fe_5O_{12}$; YIG). However, in accordance with the invention, the thin film is formed by a process which incorporates about 0.5 to 1.5 atom percent trivalent lanthanum ions ($La^{3+}$) on the dodecahedral sites of the YIG crystal lattice. The composition of the film may thus be represented as $$(Y_{3-x}La_x)Fe_5O_{12}$$

where $x$ ranges from about 0.015 to 0.045.

The value of $x$ is constrained by lattice parameter mismatch considerations. The lattice parameter of undoped YIG is about 0.008 A less than that of GGG. As a consequence of this lattice mismatch, stresses in the film arise which, if sufficiently severe, lead to cracking of the YIG film. A vlue of $x$ of about 0.015 to 0.045 reduces the lattice mismatch by at least a factor of two and permits growth of films ranging in thickness up to about 20 to 30 μm. For growth of thicker films approaching 100 μm, the value of $x$ must range from about 0.02 to 0.03; that is, about 0.67 to 1.0 atom percent of the yttrium ions on the dodecahetral sites must be replaced by $La^{3+}$.

Growth of La:YIG films is carried out employing an isothermal liquid phase epitaxy (LPE) procedure, employing growth of the film on the substrate from a molten solution of constituent oxides plus flux at a constant temperature maintained at a super-cooled condition. The substrate is conveniently fabricated by the Czochralski technique. Since those procedures are well-known and form no part of this invention, details are omitted herein. Use of the procedure permits growth of La:YIG films at about 950° C to 960° C, under conditions of about 10° C supercooling. Such a high temperature avoids viscous melts. Less viscous melts promote faster growth rate of the films, thus permitting better control over thickness uniformity. Less viscous melts also make subsequent processing more efficient, since flux removal after formation of the films is easier. Further, at such high temperatures, Pb incorporation from the flux is very small.

Growth of the La:YIG film is carried out under conditions such that a growth rate of at least about 1 μm/min is maintained. Such a growth rate is required to avoid haze and facet formation.

Figure 2:
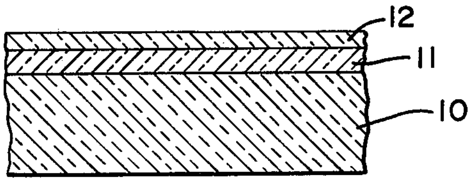

Following formations of the La:YIG film, a thin layer 12 of $SiO_2$ is formed over the film, as shown in FIG. 2. While there are many procedures available for forming $SiO_2$ layers, a process that avoids possible surface damage to the La:YIG film is preferred, since damaged films are usually less suitable for microwave applications. $SiO_2$ layers that produce substantially no damage in the La:YIG film are conventiently formed by chemical vapor deposition (CVD) of $SiO_2$ by decomposition of silane in oxygen at about 450° C. Such CVD procedures are well-known in art. Alternatively, $SiO_2$ layers are conveniently formed by using dopant-free spin-on $SiO_2$ source solutions which typically comprise organosilicon compositions. An example of such a source solution is sold under the trade designation Accuspin® solutions (available from Allied Chemical Corp., Morristown, N. J.).

The spin-on $SiO_2$ source solutions are conveniently applied to the La:YIG film by spinning the solution onto the film using a conventional photoresist spinner. The source solution is converted into $SiO_2$ by decomposition at about 200° C.

The $SiO_2$ layer that is formed is adequate to protect the La:YIG film during subsequent etching of portions of the film. However, for improved adhesion and densification of the $SiO_2$ layer to the La:YIG film, it is preferred that the $SiO_2$ layer be annealed at about 400° C to 900° C. The improved adhesion results in less undercutting of the $SiO_2$ layer during etching and hence better definition of the La:YIG disks. The improved densificiation results in less possibility of the etchant penetrating the $SiO_2$ layer.

While not critical, a temperature of about 400° C is considered to be the minimum temperature at which the improved adhesion and densification are obtained. At that temperature, a time of about 30 min is sufficient in order to realize the beneficial effects and is the minimum preferred time, while a time of about 60 min produces no further improvements and, consistent with economic considerations, is the maximum preferred time.

While not critical, a temperature of about 900° C is considered to be the maximum temperature at which the improved adhesion and densification are obtained. At 900° C, a time of about 10 min is sufficient in order to realize the beneficial effects and is the minimum preferred time, while a time of about 20 min produces no further improvements and, consistent with economic considerations, is the maximum preferred time.

The atmosphere in which the annealing is permformed is not critical, other than that it be chemically unreactive with the La:YIG film. Preferably, an inert atmosphere, such as nitrogen, is employed.

The thickness of the $SiO_2$ layer is not critical, other than being thick enough to form a continuous layer and thin enough to be removed by etching in a reasonable amount of time. A thickness about 0.5 μm is generally sufficient.

Figure 3:
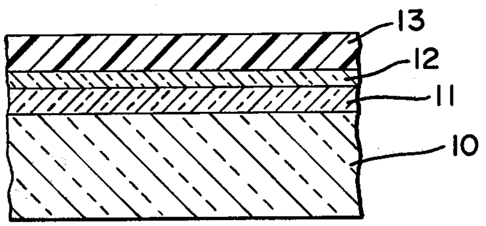

Next, a photoresist mask layer 13 is formed over the $SiO_2$ layer, as shown in FIG. 3. The photoresist material is not critical and is applied by well-known techniques.

Figure 4:
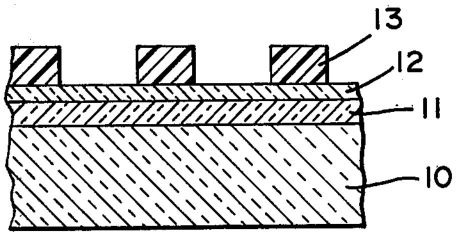

Portions of the photoresist layer are then exposed through a hole pattern mask, employing well-known techniques. Any wavelength of electromagnetic radiation commonly used, such as visible light, UV, soft X-ray and electron beam, may be employed for exposing the portions of the photoresist layer. While any pattern may be used, a geometrical array of holes that maximizes the number of La:YIG devices on the GGG slice is preferred. The dimensions of the holes are selected to result ultimately in the formation of La-YIG disks about 1 to 2 mm in diameter. The undesired portions of the photoresist layer are then removed by well-known techniques to expose portions of the underlying $SiO_2$ layer, as shown in FIG. 4.

Figure 5:
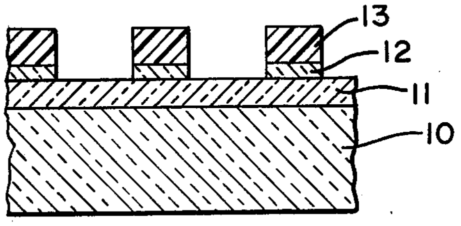

The exposed portions of the $SiO_2$ layer are then removed by an HF etchant to expose portions of the underlying La:YIG film, as shown in FIG. 5. While many buffered oxide etchants are suitable, two etchants that have been found to be particularly useful comprise either a solution of 40% $NH_4F$ and 49% HF in a ratio of about 4 to 1, which is considered to be a fast etchant, or a solution of 40% $NH_4F$ and 49% HF in a ratio of about 10 to 1, which is considered to be a slow etchant. Other etchant compositions intermediate these two etchants are also suitable. Similar buffered oxide etchants are available under the trade designations BOE 1235 (fast etchant about 1200 A/min) and BOE 500 (slow etchant, about 500 A/min), available from Allied Chemical Corp., Morristown, N.J. These etchants are conveniently used at room temperature.

Figure 6:
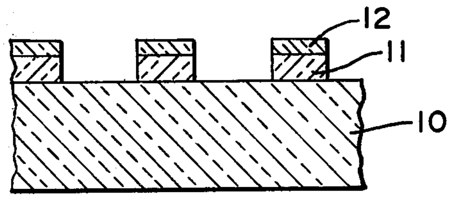

The exposed portions of the La:YIG film are then removed by a hot $H_3PO_4$ etchant to form isolated disks of La:YIG supported on the GGG substrate. The photoresist layer is also removed, usually prior to removal of the portions of the La:YIG film. A conventional solvent is employed for removal of the photoresist layer. The resulting structure is shown in FIG. 6. The $SiO_2$ layer may be either removed or left in place. However, it is preferable to leave the $SiO_2$ layer intact, since the layer may protect the La:YIG film during subsequent processing into devices.

The $H_3PO_4$ is conveniently employed as an aqueous solution of 85% $H_3PO_4$. An elevated temperature is used. A temperature of about 160° C results in a fast etch and may be employed in conjunction with the fast HF etchant. A temperature of about 140° C results in a slow etch and is preferably employed in conjunction with the slow HF etchant for reasons described below.

For 5 μm thick La:YIG disks stimulated by 9.45 Ghz, a linewidth of about 0.85 Oe is obtained for the fast $SiO_2$ etch-fast garnet etch combination, while a linewidth of about 0.45 Oe is obtained for the slow $SiO_2$ etch-slow garnet etch combination. Consequently, the slow etch combination is preferred, since narrower linewidths are obtained. Further, the slow etch combination results in better definition of the La:YIG disks.

Following the processing steps outlined above, the GGG wafer containing the disks of La:YIG is sectioned and sawn by well-known techniques to produce individual sections of GGG substrate, each supporting at least one disk of La:YIG thereon. The disks are then further processed as necessary to fabricate microwave devices therefrom, such as microwave filters, oscillators, multipliers and the like.

The process of the invention thus permits mass production of La:YIG disks for microwave device applications. Assuming the central 80% of the La:YIG film is usable and 0.25 mm spacings are made between disks, then approximately 800 1 mm diameter or 30 5 mm diameter disks may be diced from a 2.0 inch diameter wafer.

EXAMPLES

Johnson Matthey Grade I PbO, $B_2O_3$, $Fe_2O_3$, together with Molycorp 99.999% $Y_2O_3$ and Johnson Matthey 99.999% $La_2O_3$, were used for film growth of La:YIG. One inch polished <111> GGG substrates were used, on which epitaxial La:YIG films were grown at rates of at least about 1 μm/min at a temperature of about 950° C under conditions of about 10° C supercooling. X-ray diffractometer scans indicated that the film substrate mismatch was less than 0.002 A. The composition for a melt used to grow the near-zero lattice mismatch La:YIG films on GGG is presented below:

| Oxide | Moles |
|---|---|
| PbO | 2.24 |
| $B_2O_3$ | 0.152 |
| $Fe_2O_3$ | 0.199 |
| $Y_2O_3$ | 0.0211 |
| $La_2O_3$ | 0.0015 |

Unbroken La:YIG films were grown up to 18 μm in thickness. Substantially thicker near-zero mismatch films can also be grown.

The La:YIG films were then processed into disk arrays by first applying a 0.5 μm layer of $SiO_2$, employing a dopant-free spin-on $SiO_2$ source solution at room temperature. The layer was then annealed at 900° C for 15 min in $N_2$ to form and densify the $SiO_2$. A layer of a negative photoresist was then formed over the $SiO_2$ layer and exposed through a 1 mm hole pattern mask. The resulting disk pattern was maintained through an $SiO_2$ etch and then a garnet etch. The $SiO_2$ layer was impervious to the high temperature phosphoric acid etch. Two etchants were employed, a fast etch and a slow etch. The fast etch comprised a solution of 40% $NH_4F$ and 49% HF in a ratio of 4 to 1 at 25° C for the $SiO_2$ layer and an 85% $H_3PO_4$ at 160° C for the La:YIG layer. The slow etch comprised a solution of 40% $NH_4F$ and 49% HF in a ratio of 10 to 1 for the $SiO_2$ layer and 85% $H_3PO_4$ at 140° C for the La:YIG layer. The fast $SiO_2$ etch rate was about 0.1 μm/min; the slow $SiO_2$ etch rate was about 0.25 μm/min. The fast garnet etch rate was about 0.5 μm/min; the slow garnet etch rate was about 0.3 μm/min.

Following the etching of the La:YIG layer, an array of La:YIG disks distributed on the GGG substrate was obtained. The GGG substrate was then diced with a wire saw to form individual squares of GGG supporting individual La:YIG disks. Linewidths of the La:YIG disks were measured on a Varian E-12 X-Band spectrometer, employing scans of 200 Oe and 20 Oe, of (a) a rough cut 5 μm thick, 1 mm by 2 mm, fast-etched La:YIG slab (200 Oe), (b) a 5 μm thick, 1 mm diameter slow-etched La:YIG disk (200 Oe) and (c) a 5 μm thick 5 mm diameter, slow-etched La:YIG disk (20 Oe). The LA:YIG disk of (c) gave the narrowest linewidth, 0.45 Oe.

What is claimed is:

1. A process for fabricating microwave electronic devices comprising yttrium iron garnet disks which comprises
   a. forming a thin film of yttrium iron garnet, doped with about 0.5 to 1.5 atom percent of trivalent lanthanum ions, on a gadolinium gallium garnet substrate;
   b. forming a thin layer of $SiO_2$ on the lanthanum-doped yttrium iron garnet layer;
   c. forming a photoresist mask layer on the $SiO_2$ layer;
   d. removing portions of the photoresist mask layer to expose portions of the underlying $SiO_2$ layer;
   e. removing the exposed portions of the $SiO_2$ layer to expose portions of the underlying lanthanum-doped yttrium iron garnet film; and
   f. removing the exposed portions of the yttrium iron garnet film to form an array of lanthanum-doped yttrium iron garnet disks supported on the gadolinium gallium garnet substrate.

2. The process of claim 1 which further comprises slicing the array to form individual sections of gadolinium gallium garnet, each supporting at least one lanthanum-doped yttrium iron garnet disk.

3. The process of claim 1 in which the yttrium iron garnet is doped with about 0.67 to 1 atom percent of trivalent lanthanum ions.

4. The process of claim 1 in which the thin film of lanthanum-doped yttrium iron garnet is formed on the gadolinium gallium garnet substrate by an isothermal liquid phase epitaxy procedure such that the growth rate of the thin film is at least about 1 μm/min.

5. The process of claim 1 in which the thin layer of $SiO_2$ is deposited on the thin film of lanthanum-doped yttrium iron garnet by a process that produces substantially no surface damage in the thin film.

6. The process of claim 5 in which the thin layer of $SiO_2$ is deposited by applying a dopant-free spin-on $SiO_2$ source solution which is then decomposed to form $SiO_2$.

7. The proces of claim 6 in which densification and adhesion of the $SiO_2$ layer to the lanthanum-doped yttrium iron garnet film is improved by annealing the $SiO_2$ layer at a temperature of about 400° to 900° C following application of the source solution to the film.

8. The process of claim 7 in which the $SiO_2$ layer is annealed for a time ranging from about 10 to 60 min, the lower times being associated with higher temperatures.

9. The process of claim 7 in which the annealing is performed in an inert atmosphere.

10. The process of claim 1 in which the exposed portions of the $SiO_2$ layer are removed by a buffered HF solution.

11. The process of claim 10 in which the exposed portions of the $SiO_2$ layer are substantially removed by an etchant comprising a solution of 40% $NH_4F$ and 49% HF in a ratio of about 4 to 1, the etchant being maintained at about 25° C.

12. The process of claim 10 in which the exposed portions of the $SiO_2$ layer are substantially removed by an etchant comprising a solution of 40% $NH_4F$ and 49% HF in a ratio of about 10 to 1, the etchant being maintained at about 25° C.

13. The process of claim 1 in which the exposed portions of the lanthanum-doped yttrium iron garnet layer are substantially removed by an etchant comprising 85% $H_3PO_4$ at about 160° C.

14. The process of claim 1 in which the exposed portions of the lanthanum-doped yttrium iron garnet layer are substantially removed by an etchant comprising 85% $H_3PO_4$ at about 140° C.

15. The process of claim 1 in which the exposed portions of the $SiO_2$ layer are substantially removed by an etchant comprising a solution of 40% HF in a ratio of about 10 to 1, the etchant being maintained at about 25° C, and in which the exposed portions of the lanthanum-doped yttrium iron garnet layer are substantially removed by an etchant comprising 85% $H_3PO_4$ at about 140° C.

* * * * *

UNITED STATES PATENT OFFICE

CERTIFICATE OF CORRECTION

Patent No. 4,060,448 Dated November 29, 1977

Inventor(s) Michael Nemiroff, Hong Jun Yue and William R. Schevey

It is certified that error appears in the above-identified patent and that said Letters Patent are hereby corrected as shown below:

Col. 1, line 19, remove one "a".
Col. 2, line 21, "drawing" should be -- Invention --.
Col. 2, line 42, "exposed" should be — exposing --.
Col. 2, line 54, "substate" should be -- substrate --.
Col. 3, line 4, "vlue" should be -- value --.
Col. 4, line 36, "La-YIG" should be -- La:YIG --.
Col. 5, line 8, "Ghz" should be -- GHz --.
Col. 3, line 34, "formations" should be -- formation --.
Col. 6, line 5, "0.25" should be -- 0.05 --.
Col. 6, line 20, "LA:YIG" should be -- La:YIG --.
Col. 8, line 13, "40% HF" should be -- 40% $NH_4F$ and 49% HF --.

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*